Figure 1:
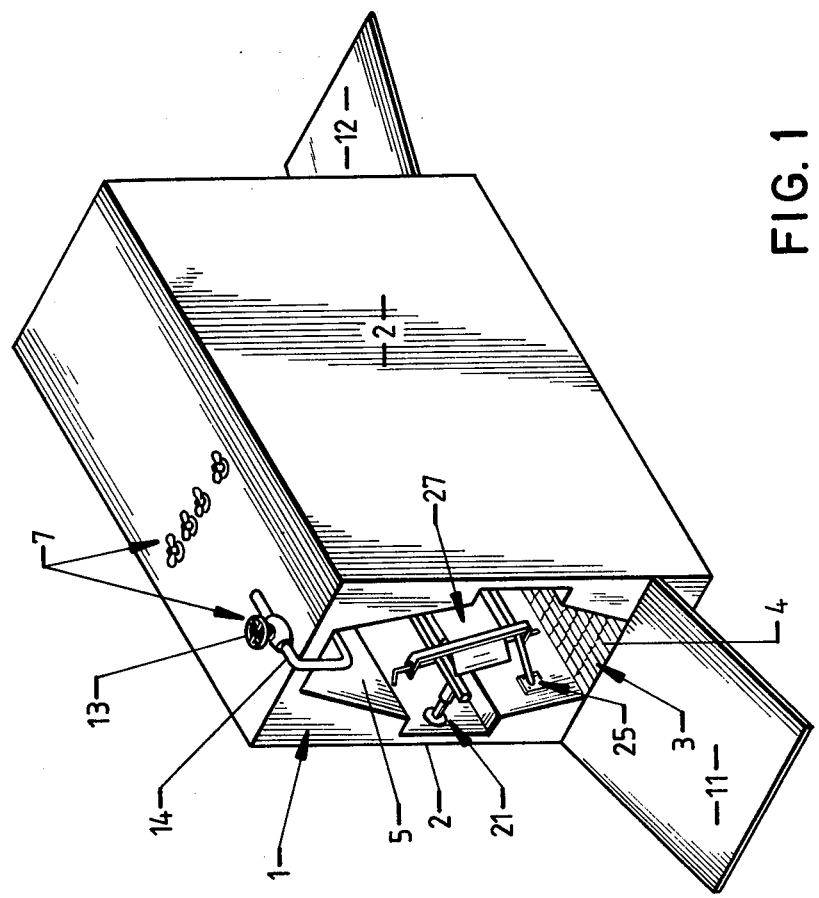

United States Patent [19]

James

[11] Patent Number: 4,478,176
[45] Date of Patent: Oct. 23, 1984

[54] SPRAYING APPARATUS

[76] Inventor: Ian W. James, 50 Hemans St., Cambridge, New Zealand

[21] Appl. No.: 421,433

[22] Filed: Sep. 22, 1982

[30] Foreign Application Priority Data

Sep. 22, 1981 [GB] United Kingdom ............... 8128560

[51] Int. Cl.³ .......................................... A01K 29/00
[52] U.S. Cl. ............................................... 119/159
[58] Field of Search ............... 119/82, 155, 158, 159, 119/160

[56] References Cited

U.S. PATENT DOCUMENTS

| 870,766 | 11/1907 | Eaton | 119/159 |
| 2,524,641 | 10/1950 | Suttles, Jr. | 119/159 |
| 2,542,280 | 2/1951 | Knapp | 119/159 |
| 4,342,285 | 8/1982 | James | 119/159 X |
| 4,379,440 | 4/1983 | Thedford et al. | 119/159 |

FOREIGN PATENT DOCUMENTS 628306 8/1949 United Kingdom ............... 119/159

Primary Examiner—Robert P. Swiatek
Attorney, Agent, or Firm—Abelman Frayne Rezac & Schwab

[57] ABSTRACT

Apparatus for spraying animals in a race includes guide rails provided at the sides of the race and which support retaining panels arranged to prevent animals from stepping or falling between the sides of the race and the guide rails.

2 Claims, 5 Drawing Figures

SPRAYING APPARATUS

This invention relates to apparatus for spraying animals.

It is an object of the present invention to provide apparatus for spraying animals which will achieve substantially full coverage of the animal's body with a treatment solution as it passes through a race.

Further objects and advantages of the present invention will become apparent from the ensuing description give by way of example.

According to a first aspect of the present invention there is provided apparatus for spraying animals comprising a race having sides and a base including a walkway, an entry and exit to and from the race and spraying means wherein said spraying means comprises a master cylinder for receiving treatment solution under pressure from a supply source, means communicable with said master cylinder for spraying treatment solution on to the back, stomach and sides of an animal within the race, and means communicable with said master cylinder for spraying treatment solution at the rear of an animal as it passes through the race.

According to a further aspect of the present invention lower portions of each side of the race mount a first pair of complementary guide rails each of said first pair of complementary guide rails supporting a plurality of forwardly directed fingers, the arrangement being such that an animal passing through the race can conveniently move in a forward direction but is discouraged from moving in a reverse direction by said forwardly directed fingers.

According to a still further aspect of the present invention there is provided apparatus for spraying animals wherein the lower portion of the side of the race mount a second pair of complementary guide rails spaced from a position below said first pair of complementary guide rails, the arrangement being such that the accessible width of the race near the feet of an animal passing through the race is less than the accessible width of the race near the body of an animal passing through the race.

According to a still further aspect of the present invention there is provided apparatus for spraying animals as wherein the complementary first and second guide rails at the sides of the race each support an elongated retainer panel arranged to prevent smaller animals from stepping or falling between the sides of the race and the complementary guide rails.

Figure 2:
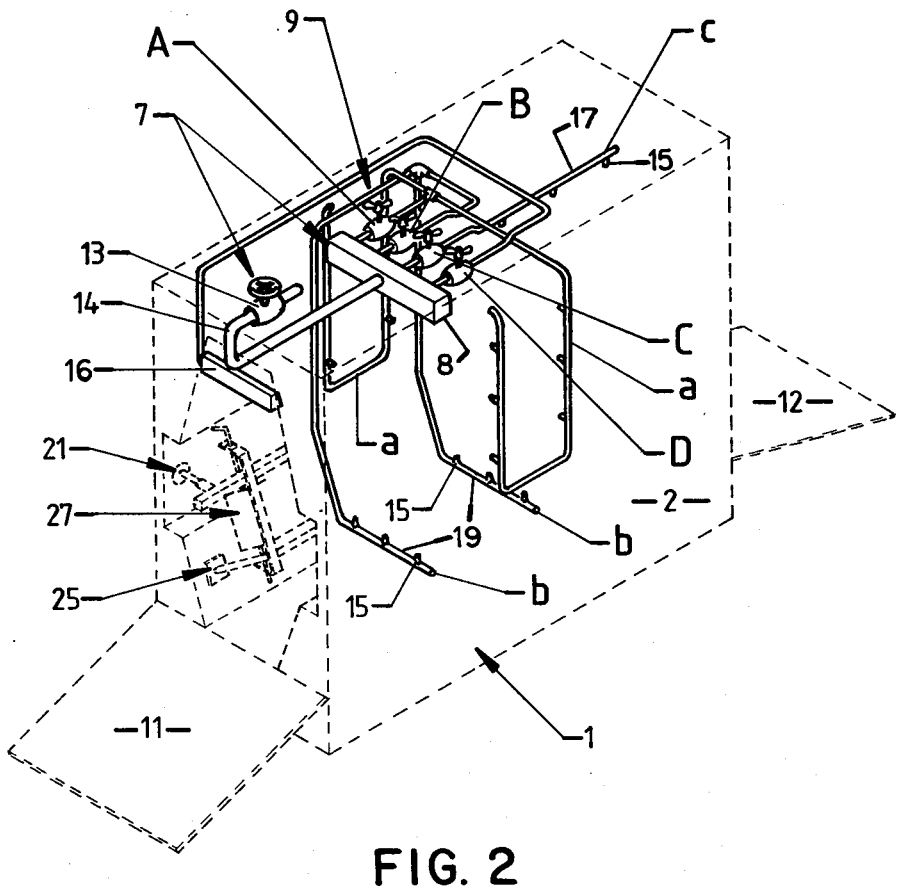
Figure 3:
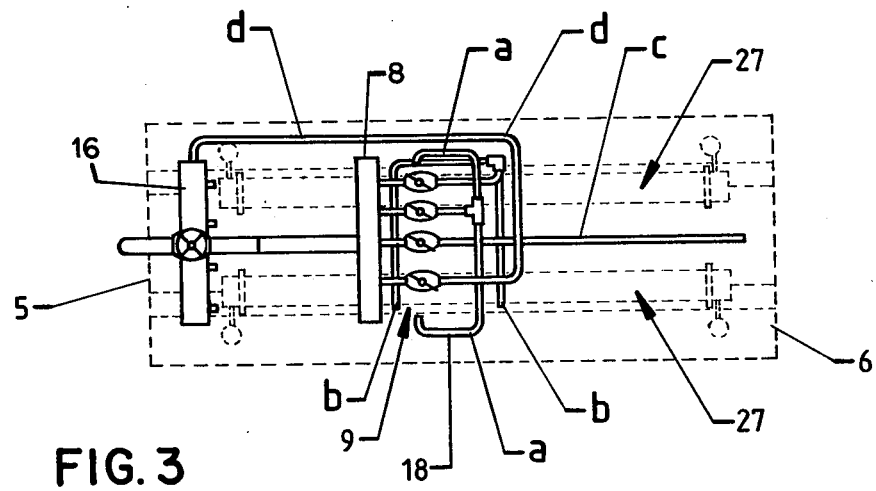
Figure 4:
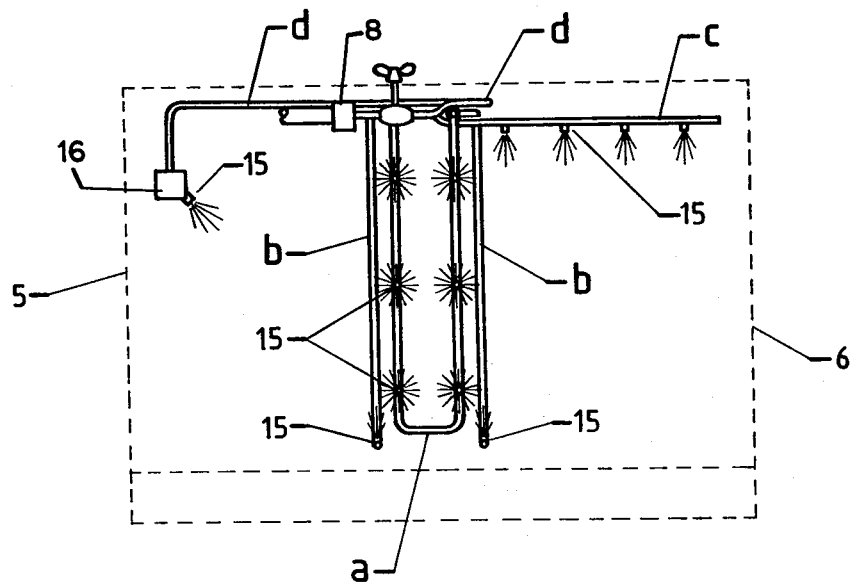
Figure 5:
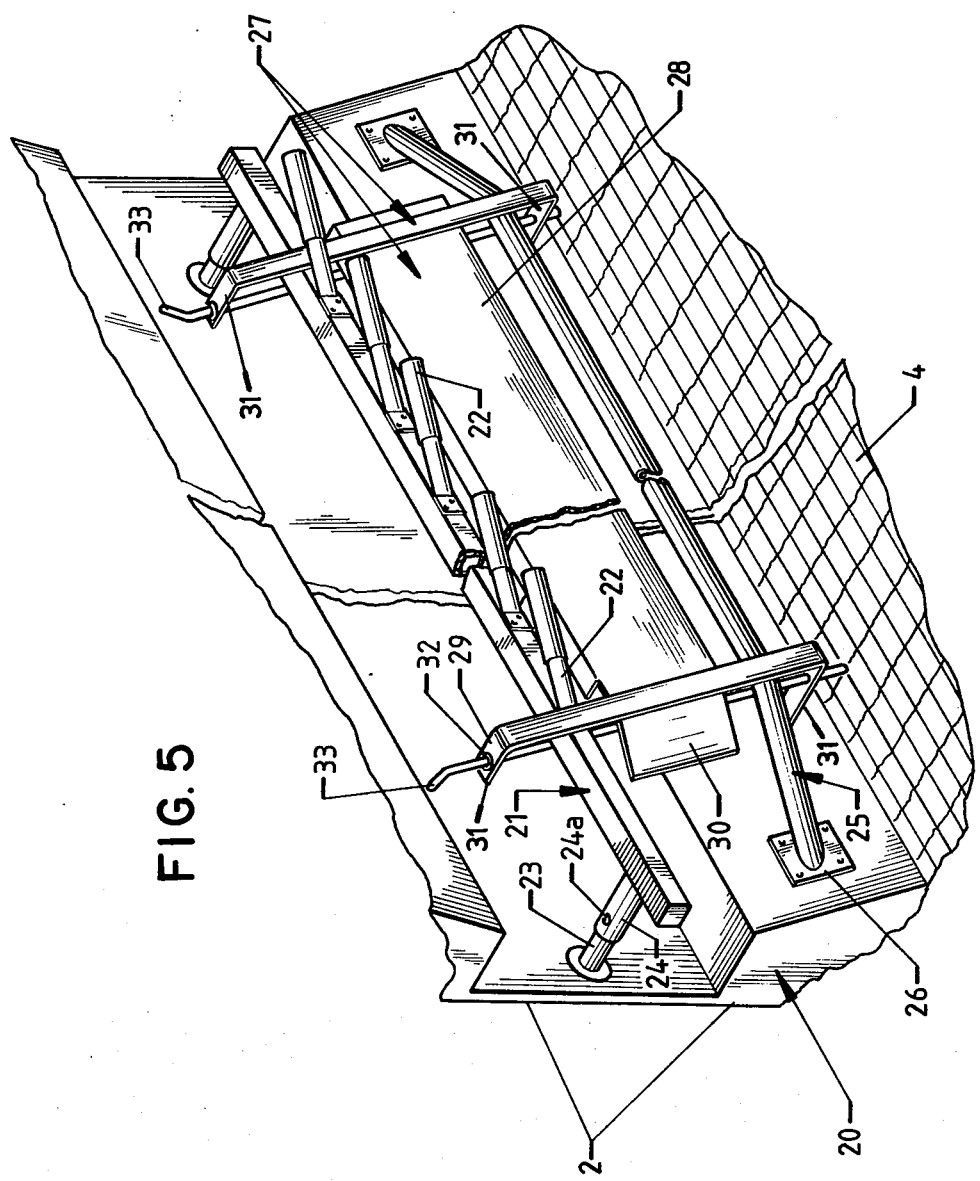

Aspects of the present invention will now be described by way of reference to the accompanying drawings in which:

FIG. 1 is a perspective view of an apparatus for spraying animals in accordance with one embodiment of the present invention, and FIG. 2 is a perspective view of spraying means for an apparatus in accordance with the present invention with the race shown in broken outline, and FIG. 3 is a plan view of spraying means for the apparatus of the present invention with the race shown in broken outline, and FIG. 4 is a side view of same spraying means in accordance with the present invention with the body of the race shown in broken outline, and FIG. 5 is a perspective view of a lower portion of one side of the race showing complementary guide rails and a retaining panel for a spraying apparatus of the present invention.

With reference to the drawings an apparatus for spraying animals in accordance with the present invention comprises a race generally indicated by arrow 1, said race having sides 2 and a base generally indicated by arrow 3 including a walkway 4 and open ends 5 and 6 providing means of entry and exit from the race. Spraying means as indicated by arrow 7 are provided for the apparatus, said spraying means comprising a master cylinder 8 for receiving treatment solution under pressure from a supply source (not shown), means generally indicated by arrow 9 communicable with said master cylinder 8 for spraying treatment on to the back, stomach and sides of an animal within the race and means communicable with the master cylinder for spraying treatment solution at the rear of an animal as it passes through the race.

The race 1 may be provided with ramps 11 and 12 which may be hinged (not shown) at the open ends of the race 1 the arrangement being such that when the apparatus is transported or stored the ramps can be used to enclose portions of the open ends of the race and secured in an upright position by locking means (not shown) associated therewith.

The master cyllinder 8 of the spraying means 7 is arranged to receive treatment solution under pressure from the source (not shown) and an inlet 13 from the supply source incorporating a shut-off valve 14 can be provided.

Four outlets are provided from the reservoir 8 each having their own shut-off valves A, B, C and D operable to control the flow of treatment solution from the reservoir 8 to pipes a, b, c and d each mounting a plurality of spray nozzles 15 each arranged to direct jets of treatment solution on to the back, stomach, sides and rear of an animal as it passes through the race.

Shut-off valve D controls the flow of treatment solution to pipe d which carries the treatment solution in to a chamber 16 near the entrance side of the race, said chamber 16 mounting nozzles 15 arranged to spray treatment solution on to the rear of an animal (see FIG. 4) as it passes through the race, the nozzles 15 being arranged to direct the spray downwardly and towards the exit 6 of the race.

Shut-off valve C controls the flow of treatment solution to pipes c, one section 17 of which extends lengthwise in the race and carries nozzles 15 adapted to spray treatment solution directly downwards on to an animal in the race and further intersecting sections 18 disposed at the sides of the race and adapted to spray treatment solution on to the sides of the animal passing through the race.

Shut-off valves A and B are arranged to control the flow of treatment solution to pipes a and b, respectively, which extend from the main reservoir 8 down one side of the race and terminate with end portions 19 mounting nozzles 15 arranged to spray treatment solution upwardly on to the stomach of the animal.

The shut-off vlaves 13, A, B, C and D, can be activated to spray the back, stomach, sides and rear of an animal separately or collectively, as required.

With reference to FIG. 5 of the drawings lower portions (generally indicated by arrow 20) of each side of the race are arranged to mount a first pair of complementary guide rails generally indicated by arrow 21 supporting a plurality of forwardly directed fingers 22, the arrangement being such that an animal passing through the race can conveniently move in a forward direction but is discouraged from moving in a reverse direction by the forwardly directed fingers 22.

In an alternative embodiment of the present invention each side of the race may mount two or three parallel side rails (not shown) such being necessary when the race is used for larger animals such as pigs or cattle.

The guide rails 21 are adjustably mounted with respect to the sides 2 of the race and in the example shown the position of the guide rail 21, relative to the sides 2 of the race, can be adjusted with respect to a mounting member 23 fixed to the sides of the race to make allowances for different sizes of animals, by sliding socket 24 of the guide rail 21 on the support member 23 and locking the sockets 24 in position using locking pins 24a or the like.

In an alternative to the mounting arrangement shown by FIG. 5 member 24 may be arranged to extend through a socket mounting means (not shown) and have the ends thereof connected to the walls 2 of the race by a compression spring or the like such that if an animal were to be in collision with the guide rails 21 some of the impact would be absorbed by the spring.

The lower portions 20 of each of the sides of the race may further mount a second pair of complementary guide rails generally indicated by arrow 25 fixed by a foot 26 to the sides 2 of the race, the arrangement being such that the accessible width of the race near the feet of an animal passing through the race is less than the accessible width of the race near the body of an animal adjacent said first pair of complementary guide rails 21.

The first and second complementary guide rails 21 and 25, respectively, can each support an elongate retaining panel generally indicated by arrow 27 which is adapted to prevent the smaller animals from stepping or falling between the sides 2 of the race and the guide rails 21 and 25.

Each retaining panel 27 includes an elongate 'U' or 'L' shaped shield 28 fixed between at least two 'U' shaped mounting brackets 29 and the retaining panel being arranged to be fixed in the position illustrated by FIG. 5.

The shield 28 can be provided with a forward portion 30 which denies access to the region behind the shield to an animal entering the race, and opposite ends 31 of the mounting brackets 29 are provided with apertures 32 arranged to receive and accommodate locking pins 33, which when the panel is in position pass behind the guide rails 21 and 25. To remove the shield 27 locking pins 33 are removed, the shield is withdrawn from the end 6 of the race.

Aspects of the present invention have been described by way of example only and modifications and additions thereto may be made without departing from the scope of the present invention as defined in the appended claims.

I claim:

1. Apparatus for spraying animals comprising a race, having sides and a base including a walkway, means of entry to and exit from the race, spraying means within the race arranged to disperse treatment solution into the interiors of the race, a first pair of inwardly extending guide rails mounted on opposite walls of the race in the region of the lower portion of the sides of the race, a second pair of inwardly directed guide rails mounted on opposite walls of the sides of the apparatus below the said first pair of guide rails, each pair of guide rails extending substantially throughout the length of the sides of the apparatus and the second pair of guide rails extending into the interiors of the apparatus to a greater extent than the first pair of guide rails such that the accessible width of the race near the feet of the animal passing through the race is less than the accessible width of the race near the body of such animal, each of said guide rails at each side of the race supporting an elongate retaining panel comprising a shield with mounting brackets extending vertically between one of the guide rails forming said first pair of guide rails and one of the guide rails forming said second pair of guide rails and from one side of the shield, such being adapted to be engaged over the guide rails and locking means, at least equal in length to said mounting brackets, for temporarily locking the mounting brackets with respect to the guide rails, the arrangement being such that the gap between the guide rails is taken up by said retaining panel to prevent small animals from stepping or falling between the guide rails of the race.

2. Apparatus for spraying animals as claimed in claim 1, wherein the mounting brackets are U-shaped members having apertured opposite ends which extend away from the shield and the locking means comprise locking pins adapted to be removably engaged in the apertures of the apertured opposite ends of the mounting brackets.

* * * * *